United States Patent
Roake et al.

(10) Patent No.: US 10,749,674 B2
(45) Date of Patent: Aug. 18, 2020

(54) FORMAT PRESERVING ENCRYPTION UTILIZING A KEY VERSION

(71) Applicant: ENTIT Software LLC, Sunnyvale, CA (US)

(72) Inventors: Timothy Roake, Sunnyvale, CA (US); Cheryl He, Sunnyvale, CA (US); Luther Martin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 180 days.

(21) Appl. No.: 15/720,777

(22) Filed: Sep. 29, 2017

(65) Prior Publication Data
US 2019/0103965 A1   Apr. 4, 2019

(51) Int. Cl.
*H04L 9/08* (2006.01)
*G06F 21/60* (2013.01)
*H04L 9/14* (2006.01)

(52) U.S. Cl.
CPC .......... *H04L 9/0891* (2013.01); *G06F 21/602* (2013.01); *H04L 9/14* (2013.01)

(58) Field of Classification Search
CPC ........ H04L 9/0891; H04L 9/14; G06F 21/602
USPC ....................................................... 380/277
See application file for complete search history.

(56) References Cited

U.S. PATENT DOCUMENTS

| | | |
|---|---|---|
| 5,175,766 A | 12/1992 | Hamilton |
| 5,295,188 A | 3/1994 | Wilson |
| 5,727,065 A | 3/1998 | Dillon |
| 5,784,461 A | 7/1998 | Shaffer |
| 5,892,900 A | 4/1999 | Ginter |
| 6,163,771 A | 12/2000 | Walker |
| 6,182,216 B1 | 1/2001 | Luyster |
| 6,230,269 B1 | 5/2001 | Spies |
| 6,259,789 B1 | 7/2001 | Paone |
| 6,263,439 B1 | 7/2001 | Hondros |
| 6,289,450 B1 | 9/2001 | Pensak |
| 6,636,833 B1 | 10/2003 | Flitcroft |
| 6,785,860 B1 * | 8/2004 | Patti ............... G06F 11/1072 714/764 |
| 6,836,765 B1 | 12/2004 | Sussman |
| 6,885,748 B1 | 4/2005 | Wang |
| 7,337,176 B1 | 2/2008 | Cheedella |

(Continued)

FOREIGN PATENT DOCUMENTS

| | | |
|---|---|---|
| EP | 1209550 A2 | 8/2007 |
| EP | 1209550 A3 | 8/2007 |

(Continued)

OTHER PUBLICATIONS

Liechti et al. "Format Preserving Encryption", Bachelor Thesis Paper, Dec. 6, 2015, 81 pages.

(Continued)

*Primary Examiner* — Alexander Lagor
*Assistant Examiner* — Moeen Khan

(57) ABSTRACT

In one example, a system for format preserving encryption utilizing a key version can include a processor, and a memory resource storing instructions executable by the processor to determine a quantity of significant bits for a value to be encrypted, mask the value to include the quantity of significant bits, perform format preserving encryption on the masked value to generate an encrypted value, and append a key version to the encrypted value.

17 Claims, 3 Drawing Sheets

(56) References Cited

U.S. PATENT DOCUMENTS

| | | |
|---|---|---|
| 7,353,388 B1 | 4/2008 | Gilman |
| 7,401,232 B2 | 7/2008 | Ono |
| 7,412,519 B2 | 8/2008 | Wang |
| 7,418,098 B1 | 8/2008 | Mattsson |
| 7,418,600 B2 | 8/2008 | Dettinger |
| 7,522,723 B1 | 4/2009 | Shaik |
| 7,580,919 B1 | 8/2009 | Hannel et al. |
| 7,624,269 B2 | 11/2009 | Appenzeller |
| 7,634,505 B2 | 12/2009 | Chasman |
| 7,650,509 B1 | 1/2010 | Dunning |
| 7,657,037 B2 | 2/2010 | Callas |
| 7,748,030 B1 | 6/2010 | Selberg et al. |
| 7,793,851 B2 | 9/2010 | Mullen |
| 7,864,952 B2 | 1/2011 | Pauker |
| 8,000,474 B1 | 8/2011 | Evans et al. |
| 8,001,585 B2 | 8/2011 | Hogan et al. |
| 8,028,169 B2 | 9/2011 | Yoshioka |
| 8,208,627 B2 | 6/2012 | Pauker |
| 8,364,951 B2 | 1/2013 | Peterka et al. |
| 8,938,067 B2 | 1/2015 | Martin |
| 8,948,375 B2 | 2/2015 | Burnett |
| 8,948,376 B2 * | 2/2015 | Hoover .................. H04L 9/0625 380/28 |
| 8,958,562 B2 | 2/2015 | Spies et al. |
| 8,971,535 B2 | 3/2015 | Reilly et al. |
| 9,208,491 B2 | 12/2015 | Spies et al. |
| 2002/0073202 A1 | 6/2002 | Wang |
| 2003/0028481 A1 | 2/2003 | Flitcroft |
| 2003/0123671 A1 | 7/2003 | He et al. |
| 2003/0191719 A1 | 10/2003 | Ginter |
| 2004/0255133 A1 | 12/2004 | Lei |
| 2005/0120200 A1 | 6/2005 | Brignone |
| 2005/0132070 A1 | 6/2005 | Redlich |
| 2005/0149823 A1 | 7/2005 | Lee |
| 2005/0198074 A1 | 9/2005 | Khayter |
| 2005/0262573 A1 | 11/2005 | Bo |
| 2006/0031923 A1 | 2/2006 | Kanai |
| 2006/0059149 A1 | 3/2006 | Dunki |
| 2007/0101139 A1 | 5/2007 | Bayer et al. |
| 2007/0294182 A1 | 12/2007 | Hammad |
| 2008/0010074 A1 | 1/2008 | Brunswig |
| 2008/0170693 A1 | 7/2008 | Spies |
| 2009/0310778 A1 | 12/2009 | Mueller |
| 2009/0313687 A1 | 12/2009 | Popp |
| 2010/0111297 A1 | 5/2010 | Pauker |
| 2011/0222687 A1 * | 9/2011 | Mori .................. H04N 7/1675 380/200 |
| 2011/0307705 A1 * | 12/2011 | Fielder .................. G06F 21/62 713/181 |
| 2013/0041578 A1 * | 2/2013 | Aono .................. G01C 21/005 701/300 |
| 2014/0089204 A1 * | 3/2014 | Spies .................. G06F 21/6209 705/71 |
| 2015/0078386 A1 * | 3/2015 | Jackson .............. H04L 45/7453 370/392 |
| 2016/0247150 A1 | 8/2016 | Spies |
| 2016/0266227 A1 | 9/2016 | Newman et al. |
| 2017/0264600 A1 * | 9/2017 | Froelicher ............. H04L 63/062 |
| 2017/0339111 A1 * | 11/2017 | Balabine ............... G06F 21/602 |
| 2018/0136871 A1 * | 5/2018 | Leidel .................. G11C 7/1006 |
| 2018/0139188 A1 * | 5/2018 | Iyer .................... H04L 63/0435 |
| 2018/0337782 A1 * | 11/2018 | Wu .......................... H04L 9/32 |

FOREIGN PATENT DOCUMENTS

| | | |
|---|---|---|
| WO | WO-2002051066 A1 | 6/2002 |
| WO | WO-2003001326 A3 | 12/2003 |
| WO | WO-2006107777 A3 | 11/2007 |

OTHER PUBLICATIONS

Spies, "Format Preserving Encryption", Voltage Security, Inc., www.semanticscholar.org, 2013, 8 pages.

Brightwell et al., "Using Datatype-Preserving Encryption to Enhance Data Warehouse Security", 2oth National Information Systems Security Conference, Oct. 7-10, 1997—Baltimore, Maryland (6 pages).

J.Black et al. "Ciphers with Arbitrary Finite Domains", RSA Conference 2002, San Jose, California, Feb. 18-22, P002, Proceedings, Lecture Notes in Computer Science, 2271 Springer 2002, ISBN 3-540-43224m, pp. 114-130.

King et al., Managing & Using MySQL, 2nd Edition, Pub. Date: Apr. 23, 2002, Chapter 3, section 3.9.4. Functions (2 pages).

Liskov et al., "Tweakable Block Ciphers" CRYPTO 2002 [online] [retreived on Jun. 29, 2010] URL:http://www.cs.wm.edu/-milskov/pubs/lirwa053102.pdf> (16 pages).

Naor et al. "On the Construction of Pseudorandom Permutations: Luby-Rackoff Revisited", Journal of Cryptology, vol. ~112, Issue 1, pp. 29-66, Jan. 1999.

Stutz et al., "On Format-Compliant Iterative Encryption of JPEG2000," Proceedings of the Eighth IEEE International Symposium on Multimedia (ISM '06), 2006 (6 pages).

T. Lookabaugh; Security analysis of selectively encrypted MPEG-2 streams; Year 2003; colorado.edu; pp. 1-12.

US Department of Commerce/National Institute of Standards and Technology, Data Encryption Standard (DES):, Oct. 25, 1999, Federal Information Processing Statndards Publication (26 pages).

* cited by examiner

FORMAT PRESERVING ENCRYPTION UTILIZING A KEY VERSION

BACKGROUND

Communication can include sensitive information for users. For example, communication that includes financial information, personal information, and/or current location information can be sensitive to particular users. To protect the sensitive information, the information can be encrypted with an encryption process. There are many different encryption processes that can be utilized. Encryption can be a process of encoding the information in such a way that only authorized users can access the information.

DETAILED DESCRIPTION

Figure 1:
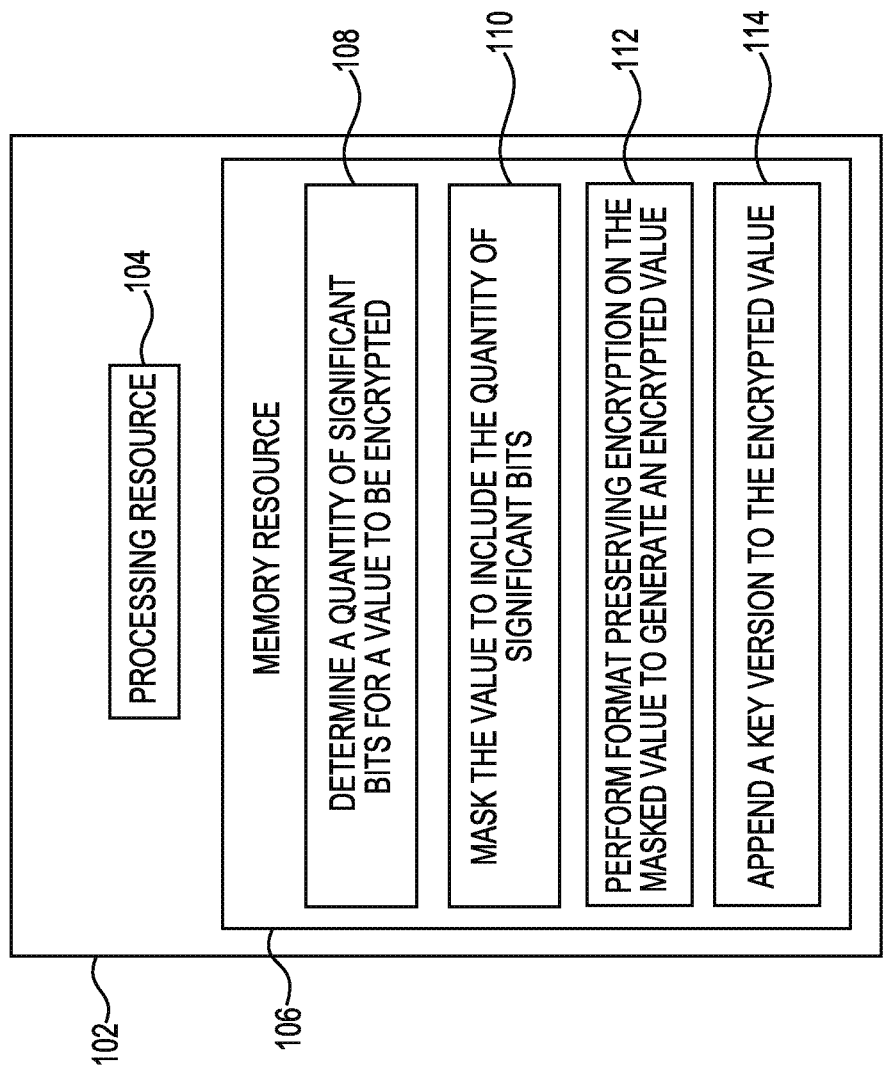
FIG. 1 illustrates an example of a computing device for format preserving encryption utilizing a key version consistent with the present disclosure.

A number of systems, devices, and methods for format preserving encryption utilizing a key version are described herein. In some examples, a system for format preserving encryption utilizing a key version can include a processor, and a memory resource storing instructions executable by the processor to determine a quantity of significant bits for a value to be encrypted, mask the value to include the quantity of significant bits, perform format preserving encryption on the masked value to generate an encrypted value, and append a key version to the encrypted value. As used herein, a bit or digit can be a quantity or unit of information. For example, a bit or digit can be a binary digit or whole number.

As used herein, format preserving encryption (FPE) can refer to encrypting such that an output of the encryption process is in a same format as the input of the encryption process. For example, a 16 digit credit card number can be an input and a different 16 digit number can be the encrypted output. In another example, a geographical location that includes a latitude and longitude values (latitude/longitude values) can be the format preserving encryption input and an encrypted value that appears like different latitude/longitude values can be the encrypted output.

The format preserving encryption process can include utilizing a key to encrypt the information and can include utilizing the same key to decrypt the information. As used herein, a key can include a string of bits for encrypting or scrambling data when utilized by an encryption algorithm. For example, the key can be utilized by a preserving encryption process to encrypt the information and the same key can be utilized to decrypt the encrypted value to the original information. In this example, the original information may not be decrypted if an incorrect key is utilized to decrypt the encrypted value.

In some examples, a plurality of keys for encrypting and decrypting the information can each be referred to as a key value. In this way, a plurality of different keys can be utilized to encrypt and decrypt different information. In some examples, utilizing a plurality of different keys can provide increased security for an information set. As described further herein, the key version can be appended into an encrypted value such that the key value can be determined utilizing the encrypted value. In this way, the key value does not have to be stored in a separate location.

In some examples, the key version can be appended or added to the encrypted value such that least significant bits (lsb) are replaced with the key version. In some examples, information can include a quantity of significant bits. In some examples, the significant bits can be values or information that can be significant for an end use. For example, significant bits for a geo path tracking application utilizing latitude/longitude values can be 9 bits for the degrees value and 19 bits for the decimal fraction value of the latitude/longitude values. In some examples, the significant bits can be determined and a quantity of least significant bits can be determined. In these examples, the least significant bits can be masked prior to encrypting the information. In these examples, the masked portion may not be encrypted and the masked portion can be replaced or appended to include the key version utilized to encrypt the non-masked portion. In this way, the key version of the key can be stored with the encrypted value.

The figures herein follow a numbering convention in which the first digit corresponds to the drawing figure number and the remaining bits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a computing device 102 for format preserving encryption utilizing a key version consistent with the present disclosure. In some examples, the computing device 102 can include a memory resource 106 that can be utilized to store instructions 108, 110, 112, 114 that can be executed by a processing resource 104 to perform functions described herein.

A processing resource 104 may be a central processing unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 108, 110, 112, 114. As an alternative or in addition to retrieving and executing instructions 108, 110, 112, 114 processing resource 104 may include an electronic circuit comprising a number of electronic components for performing the operations of the instructions 108, 110, 112, 114 in the memory resource 106. With respect to the executable instruction representations or boxes described and shown herein, it should be understood that part or all of the executable instructions 108, 110, 112, 114 and/or electronic circuits included within one box may be included in a different box shown in the figures or in a different box not shown.

Memory resource 106 may be any electronic, magnetic, optical, or other physical storage device that stores executable instructions 108, 110, 112, 114. Thus, memory resource 106 may be, for example, Random Access Memory (RAM), an Electrically-Erasable Programmable Read-Only Memory (EEPROM), a storage drive, an optical disc, and the like.

The executable instructions 110, 112 may be stored on the memory resource 106. Memory resource 106 may be a portable, external or remote storage medium, for example, that allows the system to download the instructions 108, 110, 112, 114 from the portable/external/remote storage medium. In this situation, the executable instructions 108, 110, 112, 114 may be part of an "installation package". As described herein, memory resource 106 may be encoded with executable instructions 108, 110, 112, 114 for format preserving encryption utilizing a key version as described herein.

In some examples, the memory resource 106 can include instructions 108 to determine a quantity of significant bits for a value to be encrypted. In some examples, the value to be encrypted is a latitude/longitude value representing a geographical location. In some examples, the quantity of significant bits can be determined for a particular application. For example, when the value is a latitude/longitude value and the value is utilized by a geographic tracking application. In this example, the quantity of significant bits can be determined based on a quantity of significant bits utilized by the geographic tracking application.

In some examples, the quantity of significant bits can be determined based on a quantity of bits that provide a particular level of precision when utilized by a particular application. For example, a latitude/longitude value can be utilized by a geographic tracking application. In this example, the value can include a particular quantity of bits that provide a first level of precision and the quantity of significant bits can correspond to a second level of precision for the geographic tracking application. In this example, the difference between the first level of precision and the second level of precision is within a threshold level of precision.

In some examples, the memory resource 106 can include instructions 110 to mask the value to include the quantity of significant bits. In some examples, the instructions 110 can include instructions to mask insignificant bits of the value to be encrypted. As used herein, masking a value to include the quantity of significant bits includes masking least significant bits of the value such that the masked values are not encrypted during an encryption process and are not decrypted during a decryption process.

In some examples, the masked values of the value can include selecting a portion of the value that is prevented from being encrypted by an encryption process. In this way, the masked values may not be part of an encrypted value and can be utilized to append a key version into the encrypted value. For example, only a non-masked portion of the value is encrypted while the masked portion remains unencrypted. In this example, the unencrypted masked portion can be replaced with the key version and stored with the encrypted value as described further herein.

In some examples, the memory resource 106 can include instructions 112 to perform format preserving encryption on the masked value to generate an encrypted value. As used herein, format preserving encryption can refer to encrypting such that an output of the encryption process is in a same format as the input of the encryption process. For example, a 16 digit credit card number can be an input and a different 16 digit number can be the encrypted output. In another example, a geographical location that includes a latitude and longitude values (latitude/longitude values) can be the format preserving encryption input and an encrypted value that appears like different latitude/longitude values can be the encrypted output.

As described herein, the masked value can include a masked portion and an unmasked portion. In some examples, only the unmasked portion of the masked value is encrypted utilizing format preserving encryption while the masked portion is left unencrypted. In some examples, the resulting encrypted value can include the same format as the unmasked portion of the masked value. For example, the value can include a latitude/longitude value that includes nine bits representing a geographic location. In this example, four of the least significant bits can be masked prior to encrypting the value and five significant bits can remain unmasked. In this example, the encrypted value can include the same format for the five significant bits and the four least significant bits can remain unencrypted. In this example, the four least significant bits can be replaced or appended with a key version that corresponds to a particular key value.

In some examples, the memory resource 106 can include instructions 114 to append a key version to the encrypted value. As described herein, appending the key version to the encrypted value can include replacing the masked portion of the masked value with the key version that corresponds to a key value utilized to encrypt the masked value. In this way, the key version can be stored with the encrypted value and utilized to determine a key value for decrypting the encrypted value. For example, the encrypted value can be analyzed to determine a key value utilized to encrypt the encrypted value.

In some examples, the key version corresponds to a key utilized to perform the format preserving encryption. In some examples, the instructions 114 can include instructions to append the key version to a masked portion of the value to be encrypted. As described herein the masked portion of the value can correspond to a portion of the value that is masked and/or not encrypted by the format preserving encryption process. In this way, the key version can be appended to the encrypted value to be stored with the encrypted value.

In some examples, the format preserving encryption can generate an encrypted value that is in the same format and length as the unmasked portion. In these examples, the key version can be appended to the encrypted value such that the format and length of the encrypted value is in the same format as the original value. For example, the original value to be encrypted can be 32 bits that represent a latitude/longitude value. In this example, the 32 bits can include 9 bits for the degrees portion of the latitude/longitude value, 19 bits for the decimal fraction portion of the latitude/longitude value, and 4 bits for the masked portion of the latitude/longitude value. In this example, the 28 unmasked bits can be encrypted via the format preserving encryption process and 4 bits representing the key version can be appended to the encrypted value such that the value is in the same format of 32 bits as the original latitude/longitude value.

In some examples, the memory resource 106 can include instructions to determine an encryption key to decrypt the appended encrypted value based on the key version appended to the appended encrypted value. In some examples, the encryption key can be determined based on the key version appended to the encrypted value. For example, it can be determined that four bits of least significant bits were masked prior to encrypting the value. In this example, the four bits of least significant bits can be analyzed to determine the key version and/or key value that was utilized to encrypt the value. In this example, the four bits of least significant bits that correspond to the key version can be masked and the key value utilized to encrypt the value can be utilized to decrypt the unmasked portion of the encrypted value.

In some examples, the memory resource 106 can include instructions to store the appended key version as an appended encrypted value. As described herein, the appended encrypted value that includes the appended key version can be stored so that the appended key version can be determined by analyzing the appended encrypted value, Previous examples utilized a first storage for the encrypted value and a second storage for the key version. The present disclosure describes how the key version can be stored with the encrypted value and reduce storage space by eliminating a separate storage for the key version and the encrypted value.

Figure 2:
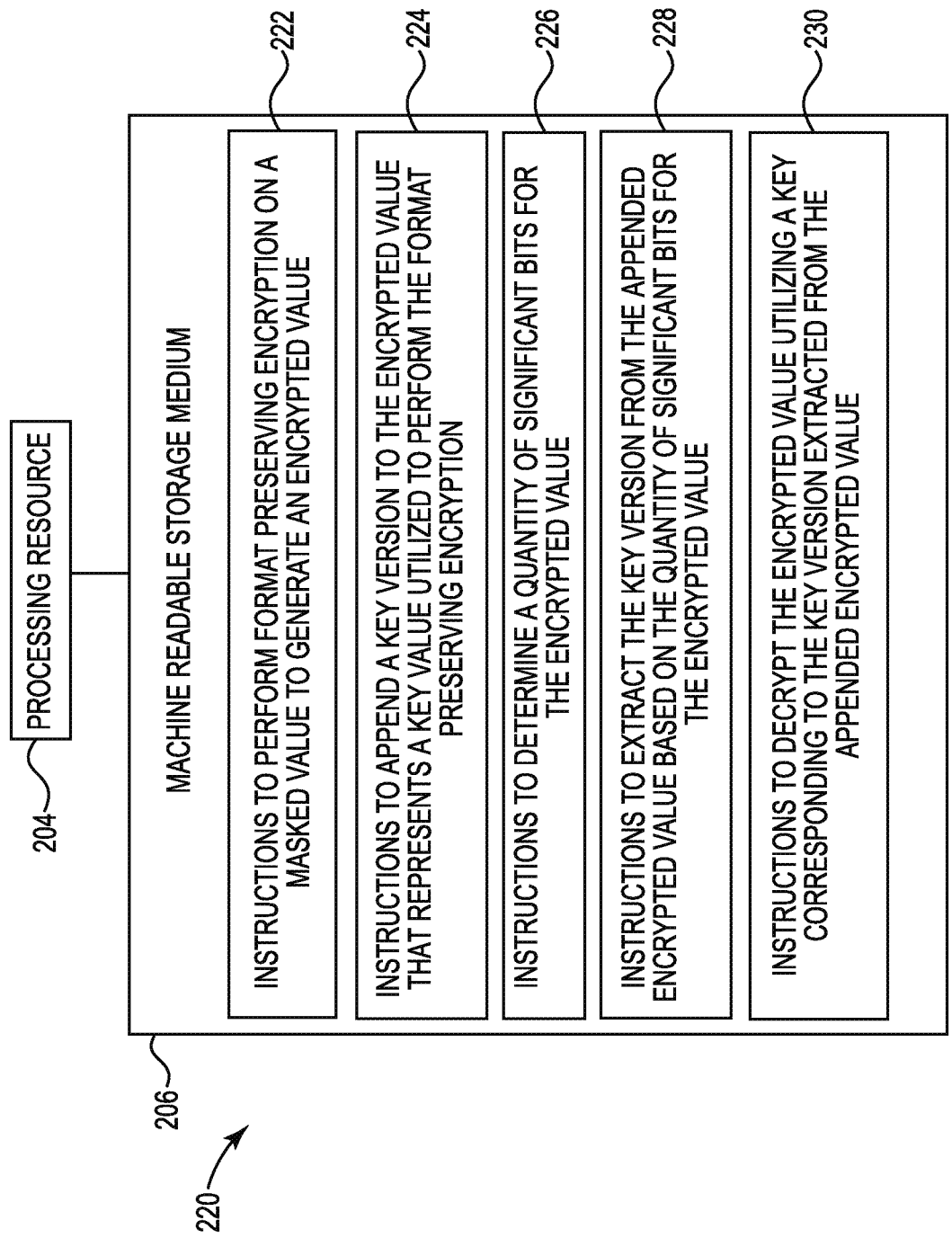
FIG. 2 illustrates an example of a system for format preserving encryption utilizing a key version consistent with the present disclosure.

FIG. 2 illustrates an example of a system 220 for format preserving encryption utilizing a key version consistent with the present disclosure. In some examples, the system 220 can include a machine-readable storage medium 206 that can be utilized to store instructions 222, 224, 226, 228, 230, that can be executed by a processing resource 204 to perform functions described herein.

A processing resource 204 may be a central processing unit (CPU), microprocessor, and/or other hardware device suitable for retrieval and execution of instructions stored in machine-readable storage medium 206. In some examples, the processing resource 204 can be coupled to the machine-readable storage medium 206 via a connection. The connection can be a physical or wireless communication connection. In the particular example shown in FIG. 2, processing resource 204 may receive, determine, and send instructions 222, 224, 226, 228, 230. As an alternative or in addition to retrieving and executing instructions 222, 224, 226, 228, 230 processing resource 204 may include an electronic circuit comprising a number of electronic components for performing the operations of the instructions 222, 224, 226, 228, 230 in the machine-readable storage medium 206. With respect to the executable instruction representations or boxes described and shown herein, it should be understood that part or all of the executable instructions 222, 224, 226, 228, 230, and/or electronic circuits included within one box may be included in a different box shown in the figures or in a different box not shown.

Machine-readable storage medium 206 may be any electronic, magnetic, optical, or other physical storage device that stores executable instructions 222, 224, 226, 228, 230. Thus, machine-readable storage medium 206 may be, for example, RAM, an EEPROM, a storage drive, an optical disc, and the like. The executable instructions 222, 224, 226, 228, 230, may be stored on the machine-readable storage medium 206. Machine-readable storage medium 206 may be a portable, external or remote storage medium, for example, that allows the system to download the instructions 222, 224, 226, 228, 230, from the portable/external/remote storage medium. In this situation, the executable instructions 222, 224, 226, 228, 230, may be part of an "installation package". As described herein, machine-readable storage medium 206 may be encoded with executable instructions 222, 224, 226, 228, 230, for remote device configurations as described herein.

In some examples, the machine-readable storage medium 206 can include instructions 222 to perform format preserving encryption on a masked value to generate an encrypted value. In some examples, the masked value is a latitude/longitude value. For example, the masked value can be a value that represents a geographical location in degrees latitude and/or degrees longitude. As described herein, the format preserving encryption can encrypt a value such that the format of the input value is the same format as the output value. For example, the input value can be in a latitude/longitude value format and the encrypted value can be in a latitude/longitude value format.

As described herein, a masked value can include a value with a masked portion and an unmasked portion. In some examples, only the unmasked portion of the value is encrypted while the masked portion is not encrypted. In some examples, the masked portion of the value can be a portion of the value that is determined to be the least significant bits of the value. In some examples, the least significant bits of the value can be bits that can have a least quantity of value for a particular application. As described herein, the value can be utilized by an application that can have a particular level of precision when utilizing the value. In some examples, the least significant bits can be bits that if altered or remove have a least amount of affect the particular level of precision.

In some examples, the machine-readable storage medium 206 can include instructions 224 to append a key version to the encrypted value that represents a key value utilized to perform the format preserving encryption. In some examples, the key version is appended to replace least significant bits of the encrypted value.

In some examples, the least significant bits or bits of the encrypted value correspond to least significant bits of the masked value. In some examples, the least significant bits are masked values. In some examples, the least significant bits of the encrypted value are masked prior to decrypting the encrypted value.

In some examples, the machine-readable storage medium 206 can include instructions 226 to determine a quantity of significant bits for the encrypted value. In some examples, determining the quantity of significant bits for the encrypted value can include determining a quantity of bits that can be utilized by an application without lowering the precision of the application when utilizing the value. In some examples, a precision threshold can be determined for a particular application and a corresponding quantity of bits to provide a precision level above the precision threshold can be determined. In these examples, the precision level of the application can be maintained above the precision threshold while still storing the key version with the encrypted value.

In some examples, the machine-readable storage medium 206 can include instructions 228 to extract the key version from the appended encrypted value based on the quantity of significant bits for the encrypted value. In some examples, the key version can be extracted from the appended encrypted value based on a determination of the least significant bits of the encrypted value. As described herein, the determined least significant bits for a value can be masked and replaced with the key version utilized to encrypt the value. In some examples, the same or similar determination of the least significant bits can be utilized to determine bits or bits utilized to store the key version.

In some examples, the machine-readable storage medium 206 can include instructions 230 to decrypt the encrypted value utilizing a key corresponding to the key version extracted from the appended encrypted value. In some examples, the key version can be utilized to determine a key value for decrypting the encrypted value. In some examples, the bits or bits utilized to determine the key value can be masked prior to decrypting the encrypted value. In these examples, the unmasked portion of the encrypted value can be decrypted. In this way the significant bits of the encrypted value can be correctly decrypted without decrypting the bits utilized to determine the key value.

As described herein, the key version can be stored with the encrypted value and reduce storage space by eliminating a separate storage for the key version and the encrypted value.

Figure 3:
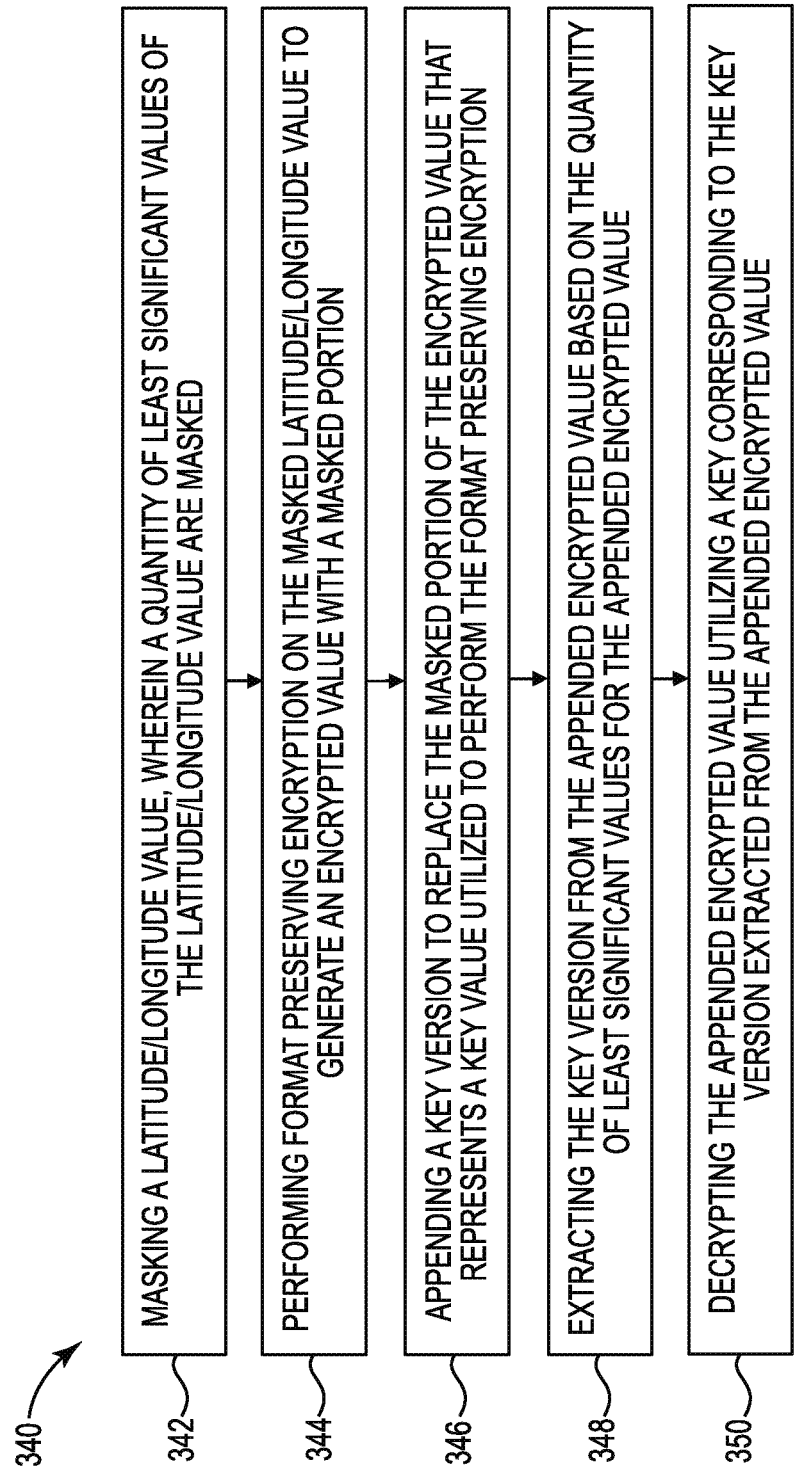
FIG. 3 illustrates an example of a method for format preserving encryption utilizing a key version consistent with the present disclosure.

FIG. 3 illustrates an example of a method for format preserving encryption utilizing a key version consistent with the present disclosure. In some examples, the method 340 can be performed by one or more computing devices. For example, the method 340 can be performed by a computing device 100 as referenced in FIG. 1 and/or or a system 220 as referenced in FIG. 2, as described herein.

At block 342, the method 340 can include masking a latitude/longitude value, wherein a quantity of least significant values of the latitude/longitude value are masked. As described herein, a quantity of least significant values of the latitude/longitude value can be determined based on a quantity of significant bits utilized by a particular application. In some examples, the masked portion of the latitude/longitude value may not be encrypted and replaced with a key version such that the key version is in the same format as the masked portion of the latitude/longitude value. This can maintain the complete format of the original latitude/longitude value to be encrypted.

At block 344, the method 340 can include performing format preserving encryption on the masked latitude/longitude value to generate an encrypted value with a masked portion. As described herein, the format preserving encryption can encrypt a value such that the format of the input value is the same format as the output value. For example, the input value can be in a latitude/longitude value format and the encrypted value can be in a latitude/longitude value format. The masked portion of the latitude/longitude value can remain unencrypted while the unmasked portion of the latitude/longitude value can be encrypted by the format preserving encryption process.

At block 346, the method 340 can include appending a key version to replace the masked portion of the encrypted value that represents a key version utilized to perform the format preserving encryption. As described herein, the key version can correspond to a key value or an encryption key that is utilized by the format preserving encryption process. In some examples, the appended key version is put into a format that is the same format as the masked portion of the encrypted value to maintain the format of the original latitude/longitude value to be encrypted.

At block 348, the method 340 can include extracting the key version from the appended encrypted value based on the quantity of least significant values for the appended encrypted value. As described herein, the appended encrypted value can be analyzed to determine the least significant bits. The least significant bits of the appended encrypted value can represent the key version of the key utilized to encrypt the original latitude/longitude value. In this example, the appended key version can be utilized to determine a key for decrypting the appended encrypted value.

At block 350, the method 340 can include decrypting the appended encrypted value utilizing a key corresponding to the key version extracted from the appended encrypted value. In some examples, decrypting the appended encrypted value can be utilized to generate the original latitude/longitude value that was encrypted. In some examples, the extracted key version can be stored with the appended encrypted value such that an application attempting to utilize the original latitude/longitude value does not have to access a separate storage to determine the key version utilized to encrypt the appended encrypted value. In some examples, the portion of the appended encrypted value that corresponds to the key version can be masked prior to decrypting the appended encrypted value such that the masked portion of the appended encrypted value is not decrypted or utilized by the application.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
a processor; and
a memory resource storing instructions executable on the processor to:
determine a first portion and a second portion of a value to be encrypted;
select a quantity of bits of the first portion based on determining that a difference between a first level of precision provided by a quantity of bits of the value to be encrypted and a second level of precision provided by the quantity of bits of the first portion is within an accuracy threshold of a program that is to utilize the value to be encrypted;
mask the value to select the second portion that is not to be encrypted, the masking of the value to provide a masked value comprising the first portion and the second portion;
perform format preserving encryption on the masked value to generate an encrypted value comprising an encrypted version of the first portion, wherein the second portion remains unencrypted in the encrypted value; and
append a key version to the encrypted value by replacing the second portion with the key version in the encrypted value.

2. The system of claim 1, wherein the key version corresponds to a key utilized to perform the format preserving encryption.

3. The system of claim 1, wherein the second portion comprises least significant bits of the value to be encrypted, the least significant bits of the value to be encrypted being separate from the bits of the first portion.

4. The system of claim 1, wherein the instructions are executable on the processor to store the encrypted value with the appended key version in a storage.

5. The system of claim 4, wherein the instructions are executable on the processor to determine an encryption key to decrypt the encrypted version of the first portion based on the key version appended to the encrypted value.

6. The system of claim 1, wherein the value to be encrypted comprises a latitude/longitude value representing a geographical location.

7. The system of claim 1, wherein the instructions are executable on the processor to:
select a quantity of bits of the second portion based on the selected quantity of bits of the first portion.

8. A non-transitory machine-readable storage medium comprising machine-readable instructions that upon execution cause a computer to:
form, based on a value to be encrypted, a masked value comprising a first portion to be encrypted by a format preserving encryption, and a second portion to remain unencrypted by the format preserving encryption, wherein the forming of the masked value comprises selecting a quantity of bits of the first portion based on determining that a difference between a first level of precision provided by a quantity of bits of the value to be encrypted and a second level of precision provided by the quantity of bits of the first portion is within an accuracy threshold of a program that is to utilize the value to be encrypted;

perform the format preserving encryption on the masked value to generate an encrypted value comprising an encrypted version of the first portion and the unencrypted second portion;

append a key version to the encrypted value by replacing the unencrypted second portion with the key version in the encrypted value, the key version representing a key value utilized to perform the format preserving encryption;

store the encrypted value with the appended key version;

extract the key version from the stored encrypted value; and decrypt the encrypted version of the first portion utilizing a key corresponding to the key version extracted from the stored encrypted value.

9. The non-transitory machine-readable storage medium of claim 8, wherein the machine-readable instructions upon execution cause the computer to determine the key using the key version extracted from the stored encrypted value.

10. The non-transitory machine-readable storage medium of claim 9, wherein the second portion comprises least significant bits of the value to be encrypted, the least significant bits of the value to be encrypted being separate from the bits of the first portion.

11. The non-transitory machine-readable storage medium of claim 10, wherein the machine-readable instructions upon execution cause the computer to mask least significant bits of the encrypted value prior to decrypting the encrypted value.

12. The non-transitory machine-readable storage medium of claim 8, wherein the value to be encrypted comprises a latitude/longitude value.

13. The non-transitory machine-readable storage medium of claim 8, wherein the machine-readable instructions upon execution cause the computer to:

select a quantity of bits of the second portion based on the selected quantity of bits of the first portion.

14. A method performed by a system comprising a hardware processor, comprising:

masking a value to be encrypted, to form a masked value comprising a first portion to be encrypted and a second portion to remain unencrypted;

selecting a quantity of bits of the first portion based on determining that a difference between a first level of precision provided by a quantity of bits of the value to be encrypted and a second level of precision provided by the quantity of bits of the first portion is within an accuracy threshold of a program that is to utilize the value to be encrypted;

performing format preserving encryption on the masked value to generate an encrypted value comprising an encrypted version of the first portion and the unencrypted second portion;

appending a key version to replace the unencrypted second portion of the encrypted value with the key version useable to derive a key to decrypt the encrypted value; and store the encrypted value with the appended key version for use by the program.

15. The method of claim 14, wherein the format preserving encryption maintains a format of the value to be encrypted.

16. The method of claim 14, comprising masking the appended key version prior to decrypting the encrypted value.

17. The method of claim 14, comprising:

determining a quantity of bits of the second portion based on the selected quantity of bits of the first portion.

* * * * *